United States Patent [19]
Soultanian

[11] Patent Number: 6,121,697
[45] Date of Patent: Sep. 19, 2000

[54] RECIPROCATING MOTOR WITH INTERNAL PIVOT POINT

[75] Inventor: Daniel S. Soultanian, Hattiesburg, Miss.

[73] Assignee: Sunbeam Products, Inc., Boca Raton, Fla.

[21] Appl. No.: 09/005,120

[22] Filed: Jan. 9, 1998

[51] Int. Cl.[7] .......................... H02K 33/00; H02K 33/02
[52] U.S. Cl. .................... 310/29; 310/15; 310/36
[58] Field of Search .................. 310/15, 20, 21, 310/29, 36; 335/203; 30/45

[56] References Cited

U.S. PATENT DOCUMENTS

| | | | |
|---|---|---|---|
| 2,283,551 | 5/1942 | Hanley | 310/29 |
| 2,351,623 | 6/1944 | Martin | 310/29 |
| 2,764,703 | 9/1956 | Anton | 310/29 |
| 3,573,514 | 4/1971 | Race | 310/17 |
| 3,735,297 | 5/1973 | Pfenning | 335/203 |
| 3,863,114 | 1/1975 | De Mayo | 335/273 |
| 3,889,371 | 6/1975 | de Boer | 30/34.1 |
| 3,894,817 | 7/1975 | Majoros et al. | 310/30 |
| 3,931,554 | 1/1976 | Spentzas | 310/30 |
| 3,962,783 | 6/1976 | Rentema | 30/34.1 |
| 3,967,372 | 7/1976 | Beck et al. | 30/34.1 |
| 3,970,978 | 7/1976 | Langree | 335/203 |
| 3,994,272 | 11/1976 | Brinkman | 310/29 |
| 4,160,177 | 7/1979 | Ascoli | 310/22 |
| 4,169,234 | 9/1979 | Yonkers | 310/29 |
| 4,392,092 | 7/1983 | Gassner | 318/127 |
| 4,950,985 | 8/1990 | Voss et al. | 361/170 |
| 5,222,878 | 6/1993 | Osada et al. | 417/417 |
| 5,563,871 | 10/1996 | Bargerhuff et al. | 310/36 |
| 5,706,150 | 1/1998 | Williams | 310/36 |

FOREIGN PATENT DOCUMENTS

| | | |
|---|---|---|
| 0 802 614 | 10/1997 | European Pat. Off. . |
| 264 694 | 10/1949 | Switzerland . |
| 1 478 981 | 7/1977 | United Kingdom . |

*Primary Examiner*—Clayton LaBalle
*Attorney, Agent, or Firm*—Kramer Levin Naftalis & Frankel LLP

[57] ABSTRACT

A motor for providing reciprocating motion comprises a stator defining an arcuate pole face and a flat pole face and an armature defining a complimentary arcuate pole face and flat pole face, where the armature rotates about a pivot internal to the structure of the armature in order to maintain a fixed air gap between the arcuate pole faces of the stator and the armature and a variable air gap between the flat pole faces of the stator and the armature.

13 Claims, 9 Drawing Sheets

RECIPROCATING MOTOR WITH INTERNAL PIVOT POINT

BACKGROUND OF THE INVENTION

1. Field of the Invention

The present invention relates to motors of the type having an oscillating or vibrating armature capable of providing a reciprocating motion to a load attached thereto.

2. Description of the Prior Art

Vibrating motors are well known in the art and are widely used in devices requiring a reciprocating action as opposed to a rotating action. Examples of such devices include dry shavers, hair clippers, massagers, sanders, engravers and certain types of pumps. The typical motor of this type comprises a stator assembly, which is held in a stationary position with respect to the housing of the device, and an armature assembly, which is pivotally attached to the housing of the device and which is allowed to move in a vibrating relation to the stator assembly. The load requiring the reciprocating motion, for example, the blade of a hair clipper, is therefore typically attached to the armature of the motor.

The stator and armature assemblies may be formed from a plurality of laminations composed of a material capable of conducting a magnetic flux, which are riveted or form fitted together. Steel is commonly used for this purpose. The stator is usually formed in the shape of a "U" or an "E," with the ends of the legs of the stator forming magnetic poles having pole faces thereon. The stator further comprises one or more coils of insulated wire wound around one or more legs thereof. Introducing an electrical signal into the coil of wire will cause a magnetic flux to be induced into the core of the stator, which is formed by the stack of laminations.

The armature of the motor is shaped in a manner complimentary to that of the stator, with an equal number of poles, also having pole faces. The stator and armature are mounted such that the pole faces of the armature face the poles faces of the stator, separated by an air gap. The armature may be held in its resting position by a resilient means, such as a spring, which will maintain the air gap between the pole faces of the armature and the poles faces of the stator. As is well known by those of ordinary skill in the art, the stator and armature pole faces attract each other, closing the air gap, when the core is magnetized by introducing an electric current into the windings. An alternating current (AC) signal will induce a magnetic flux into the core of the stator and armature and a magnetic field into the air gap. This causes the poles of the armature and the stator to be drawn together and the armature to rotate about the pivot point and bias the resilient means. During each half of the AC signal cycle, as the voltage increases, the strength of the magnetic field induced into the air gap increases, and the stator and armature are drawn together, compressing the spring. As the voltage decreases, the magnetic field weakens, thereby allowing the spring to return the armature to its resting position. Thus, it can be seen that the armature will vibrate at a rate twice that of the frequency of the AC current signal introduced into the windings. Preferably, the pole faces of the stator and armature never touch each other.

One problem encountered in the manufacture of the reciprocating motor of the prior art is that several adjustments need to be made to each unit, which increases the manufacturing time, and, therefore, the manufacturing cost. Typically, an adjustment will be made to the pivot point to adjust the position of the armature with respect to the stator, and a second adjustment will be made to set the tension on the spring. The object of the adjustments will be to keep the armature and stator from contacting each other while the armature is vibrating, and to minimize the noise and vibration generated by the motor. Typically, several iterations of adjustments will need to be made, since making one adjustment will affect the other adjustment point.

Accordingly, it is desired to provide an improved design for a reciprocating or vibrating motor which will eliminate the need to perform the labor-intensive and time consuming adjustments necessary with the current design.

SUMMARY OF THE INVENTION

A reciprocating motor comprises a stator composed of a plurality of steel laminations and having a singular coil of enameled copper wire wound around the stator. An armature, also comprised of a plurality of steel laminations, is provided, having a hole through the laminations to accept a post which acts as the pivot point for the armature. At the point of the armature's pivot, the pole face of the armature is arcuate in shape, and is placed in close proximity to a mating arcuate shaped pole face of the stator, thereby defining an extremely narrow air gap between the armature and the stator. The opposite end of the stator defines a flat pole face. A mating flat pole face is defined on the armature. The flat pole faces of the stator and armature define an air gap of the size and type commonly known in the prior art. A resilient means is provided along a load-bearing member attached to the armature in order to hold the armature in its resting position and to provide the force to vibrate the armature against the magnetic field induced into the air gap by the coil of wire.

By providing this new design for a reciprocating motor wherein the pivot point of the armature is internal to the laminations of the armature and fixed in position with respect to the stator, the need for adjusting the pivot point during manufacture is eliminated, leaving only the spring tension adjustment, which can now be performed in a single iteration, thereby lowering manufacturing costs. Another effect of this design is that the stator and armature are more efficient at conducting magnetic flux and therefore require less steel in the laminations and a fewer number of windings of the coil to perform the same work, thereby also lowering the cost of materials.

BRIEF DESCRIPTION OF THE DRAWINGS

The present invention will be better understood from the following detailed description of the preferred embodiment of the invention, taken in conjunction with the accompanying drawings, in which like reference numerals refer to like parts, and in which.

DESCRIPTION OF THE PREFERRED EMBODIMENT

Figure 1:
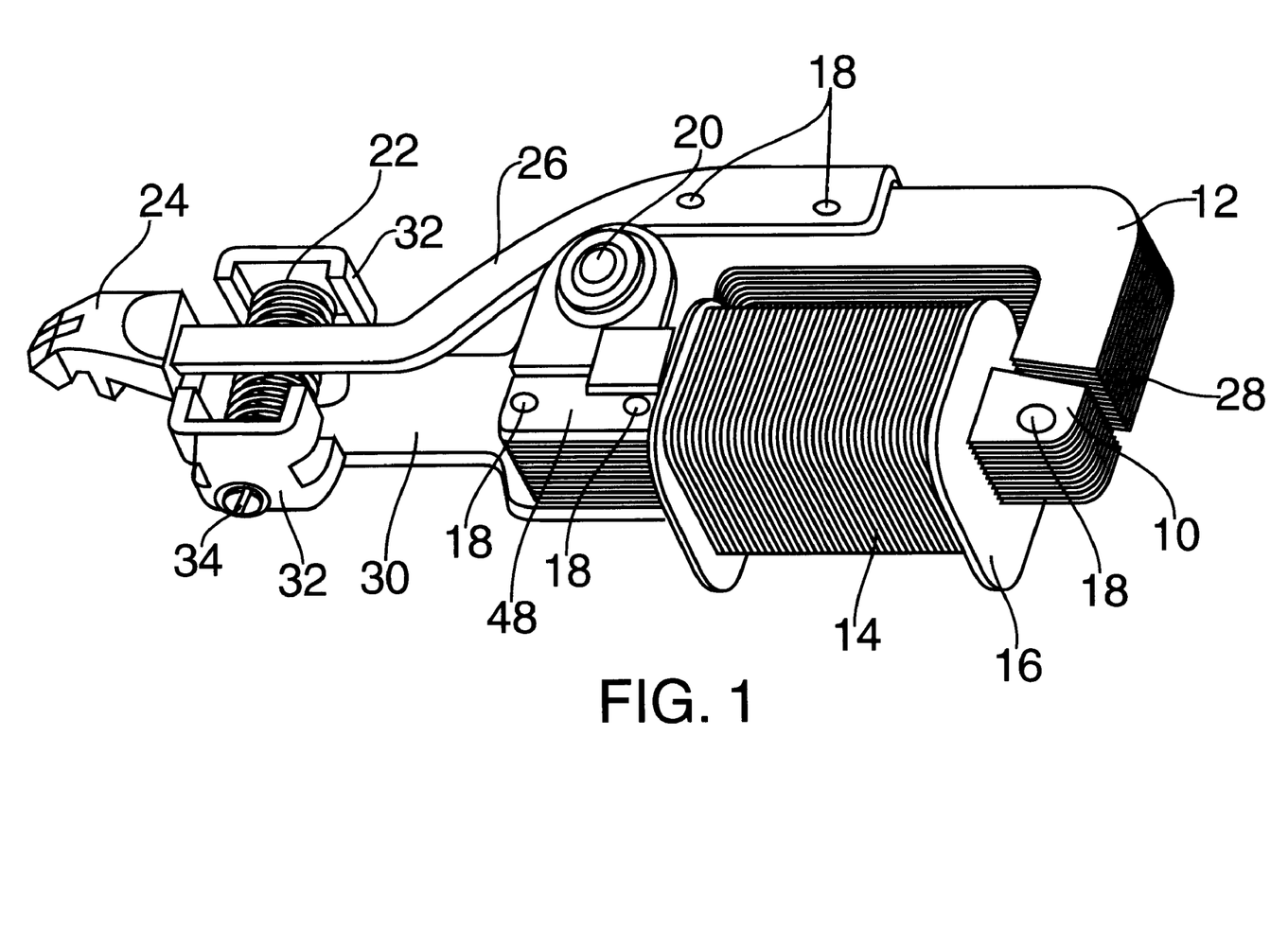
FIG. 1 is a perspective view of the new motor design.
Figure 2:
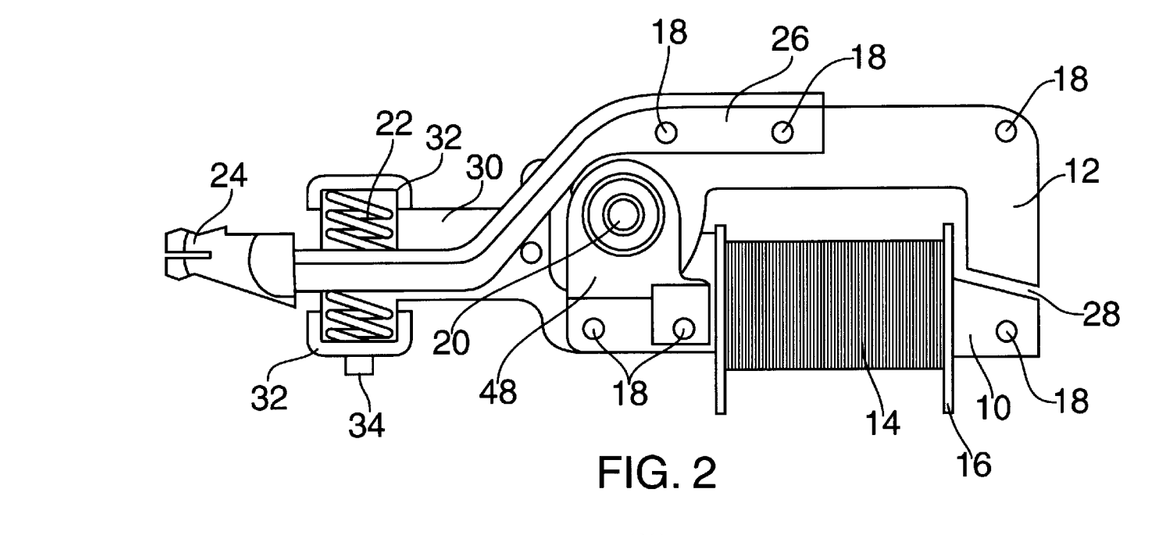
FIG. 2 is a front elevational view of the new motor design.
Figure 3:
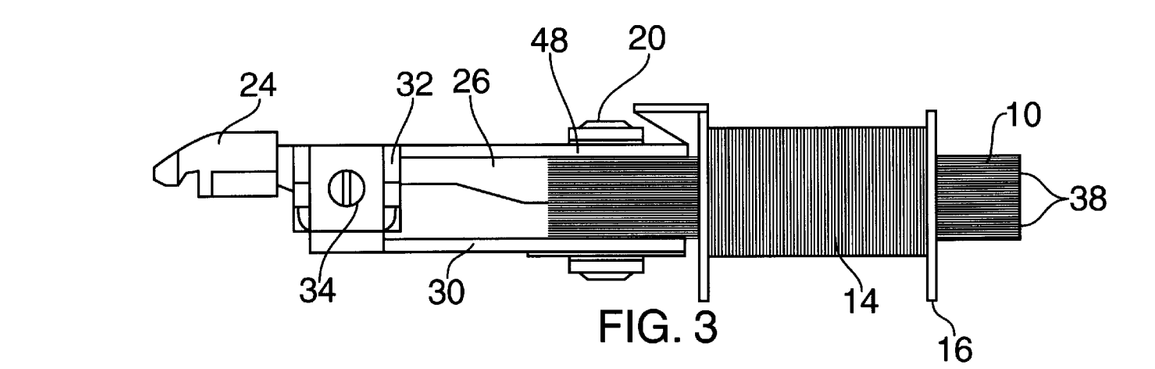
FIG. 3 is a bottom view of the new motor design.
Figure 4:
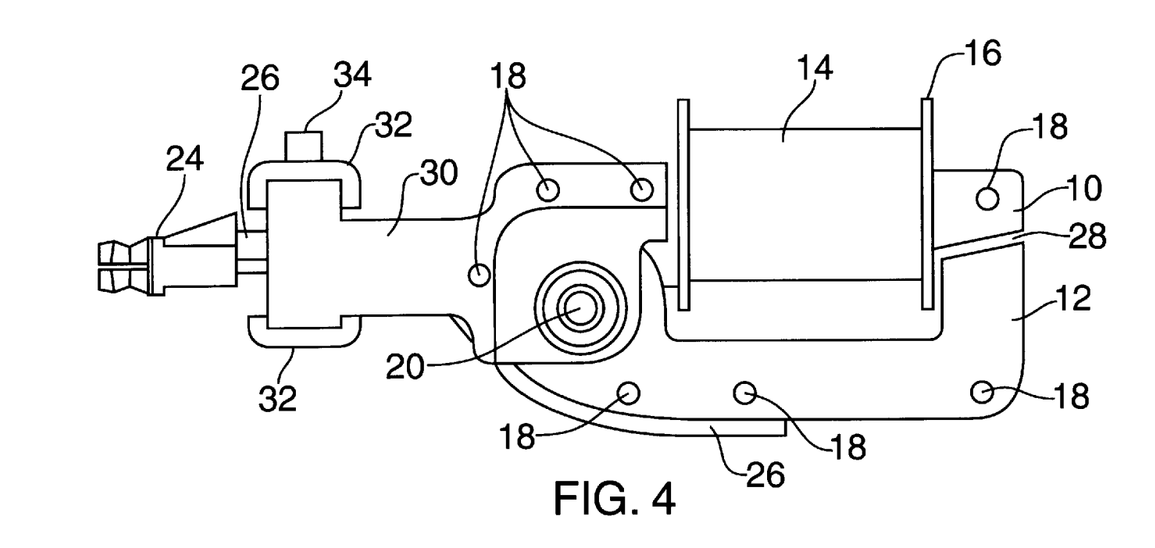
FIG. 4 is a back elevational view of the new motor design.
Figure 5:
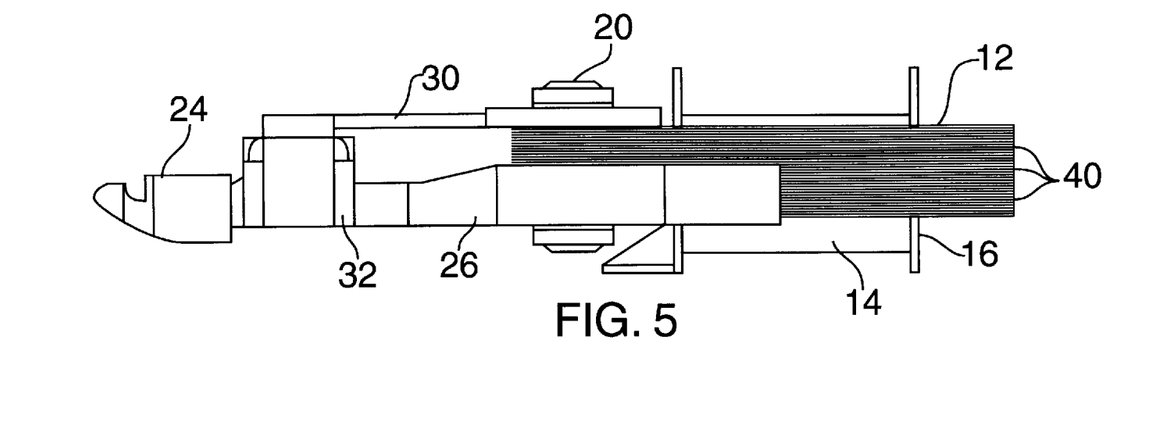
FIG. 5 is a top view of the new motor design.
Figure 12:
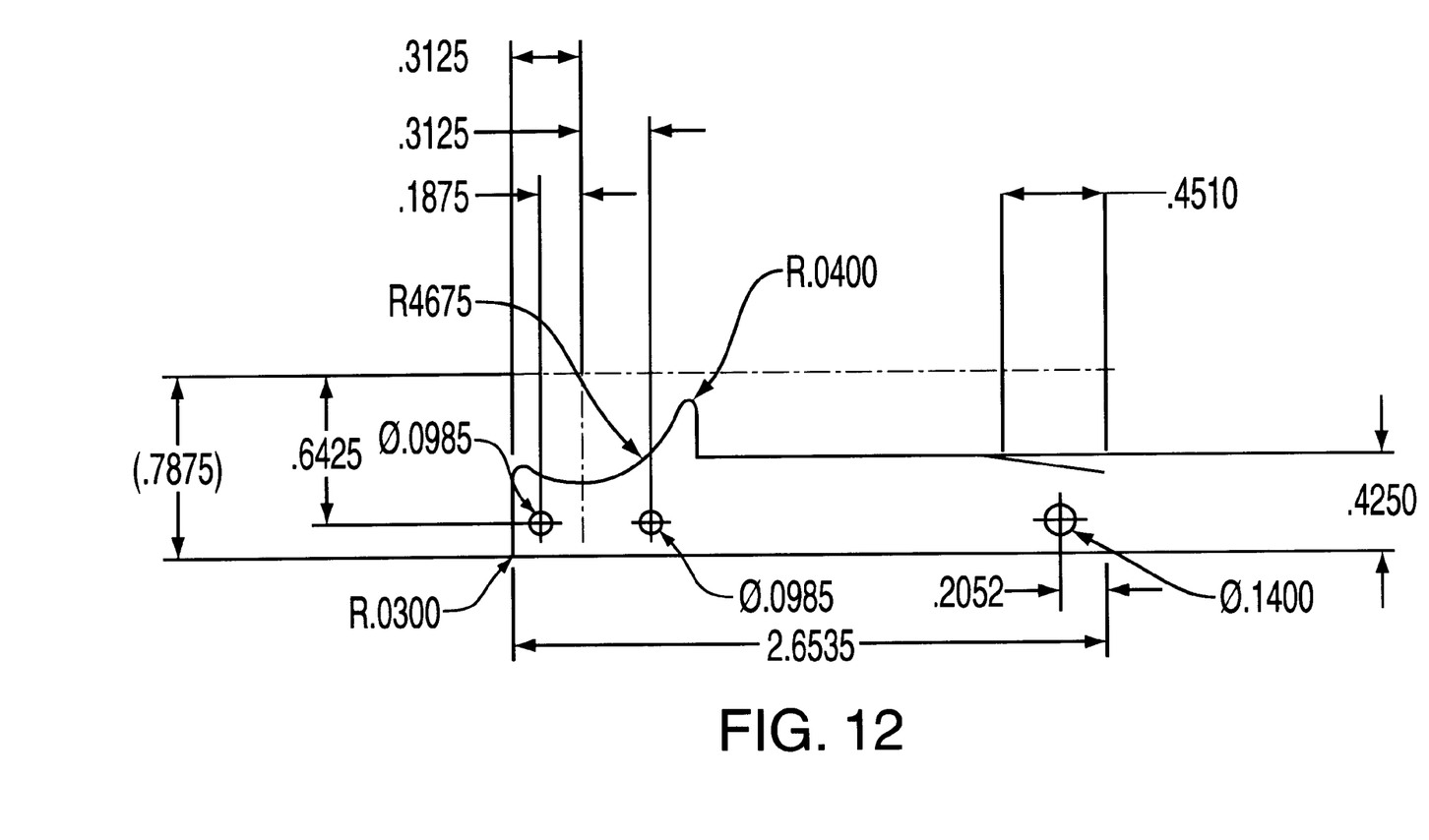
FIG. 12 is an engineering drawing of the stator lamination, showing the measurements of the fixed air gap.
Figure 13:
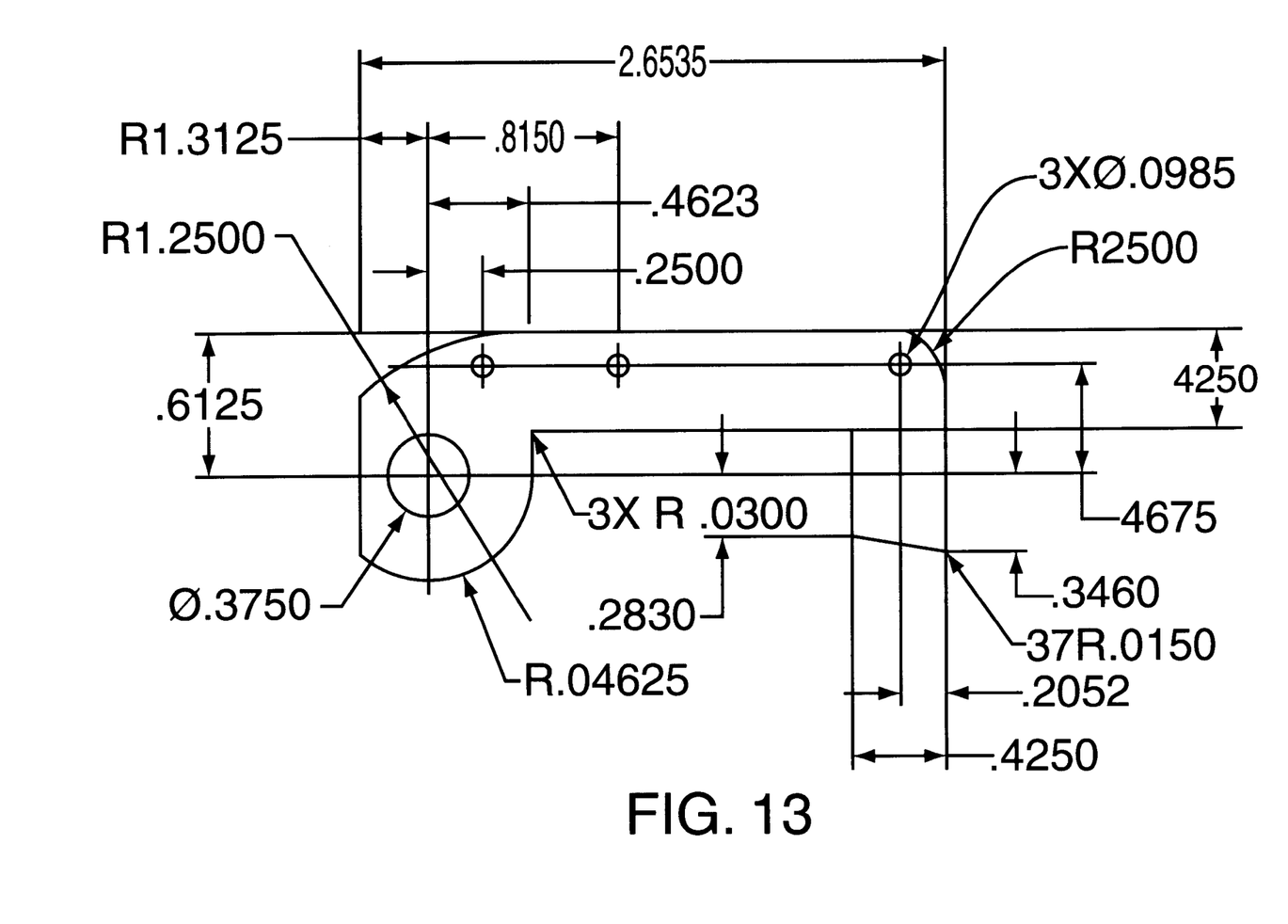
FIG. 13 is an engineering drawing of the armature lamination, showing the measurements of the fixed air gap.

As shown in FIGS. 1–3, the primary components of the motor of the present disclosure comprise stator 10 and armature 12. Both stator 10 and armature 12 comprise a stack of individual laminations, 38 and 40 respectively, which are held together by rivets 18. Stator 10 is fixed to housing member 30 via rivets 18. Armature 12 is pivotally attached to housing member 30 by pivot 20. The spacing between stator 10 an armature 12 is maintained by virtue of the attachments to housing member 30 just described and by spacing member 48 located on the opposite side of stator 10 and armature 12 from housing member 30. Arcuate pole face 44 is defined by stator 10, and complimentary arcuate pole face 46 is defined by stator 12. The close proximity of arcuate pole face 44 of stator 10 and arcuate pole face 46 of armature 12 forms arcuate air gap 29 (best seen on FIG. 6) which, in the preferred embodiment, will be between 0.005 and 0.010 inches in width. FIGS. 12 and 13 show the dimensions of one possible embodiment of the arcuate pole faces of the stator and armature laminations. Armature 12 is free to rotate around pivot 20, thereby varying the width of air gap 28. Pivot 20 is positioned in pivot hole 36, best shown in FIGS. 6–8, which is defined at the center of a circle, the circumference of which contains an arc which defines arcuate pole face 46 of armature 12. Load bearing member 26 is connected to armature 12 by rivets 18 and also serves to couple armature 12 to biasing spring 22.

Figure 6:
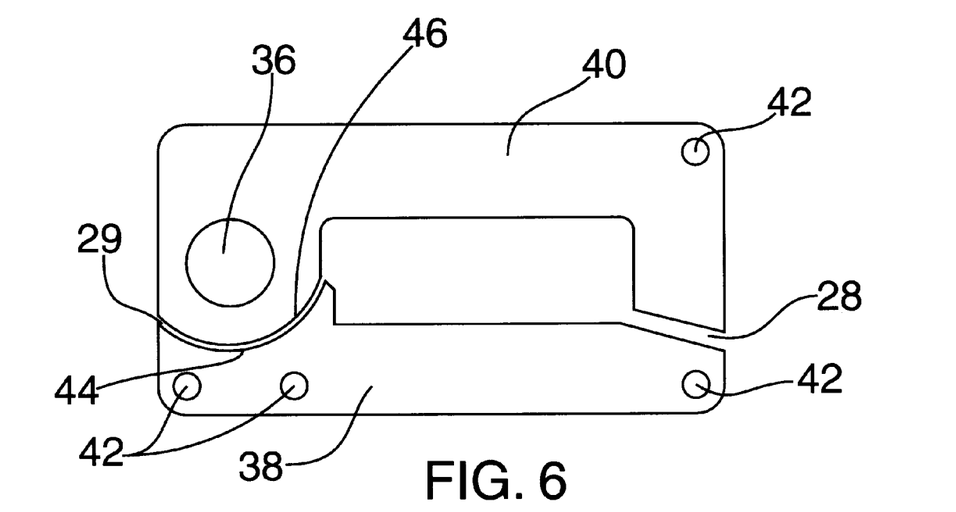
FIG. 6 is a drawing of a single stator and armature lamination of the new motor design.
Figure 7:
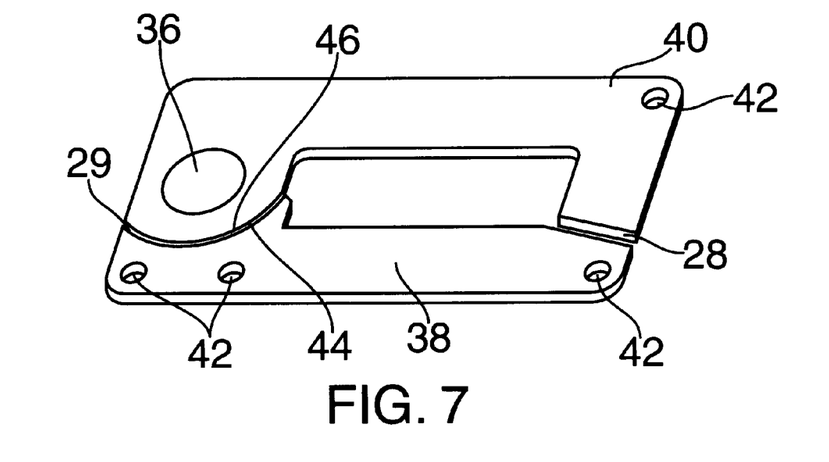
FIG. 7 is a perspective view a single stator and armature lamination of the new motor design.

Stator 10 and armature 12 are composed of a series of stacked laminations of the type shown in FIGS. 6 and 7. In the preferred embodiment, 17 laminations are used for both stator 10 and armature 12, each lamination having an approximate height of 0.025 inches, for a total height of stator 10 and armature 12 of approximately 0.425 inches. Coil 14 is preferably composed of enameled copper wire wrapped around plastic bobbin 16. In the preferred embodiment, approximately 2000 turns of wire are used. Stator 10 passes through the center of plastic bobbin 16 such that coil 14 wraps around stator 10, such that a magnetic flux is induced into stator 10 when an electric current is coupled to coil 14. Air gap 28 is defined between the pole faces of stator 10 and armature 12 and in the preferred embodiment varies in width between a minimum of about 0.010 to 0.020 inches and a maximum of about 0.100 to 0.120 inches as armature 12 vibrates with respect to stator 10.

Figure 9:
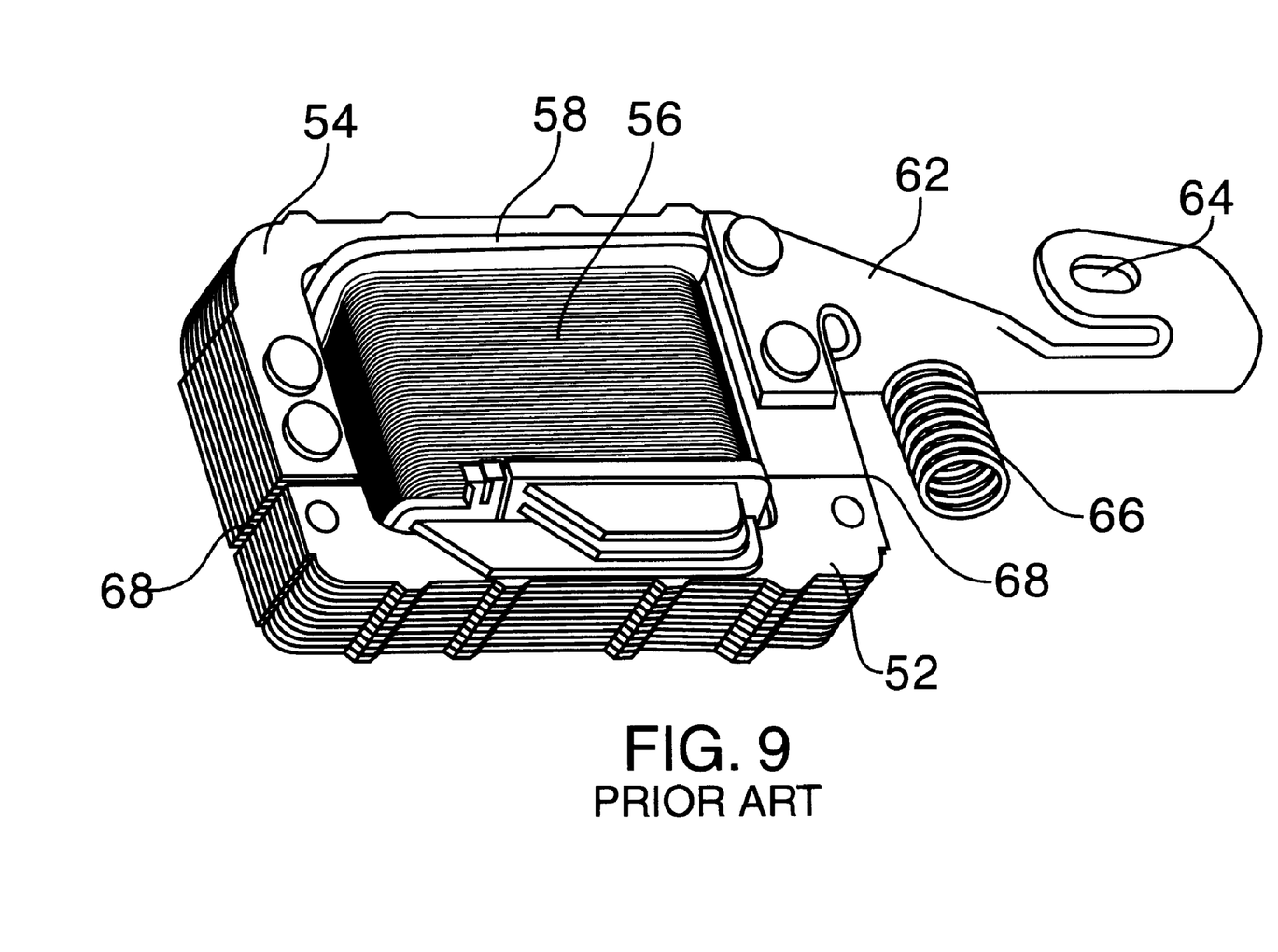
FIG. 9 is a perspective view of a typical prior art motor design.
Figure 10:
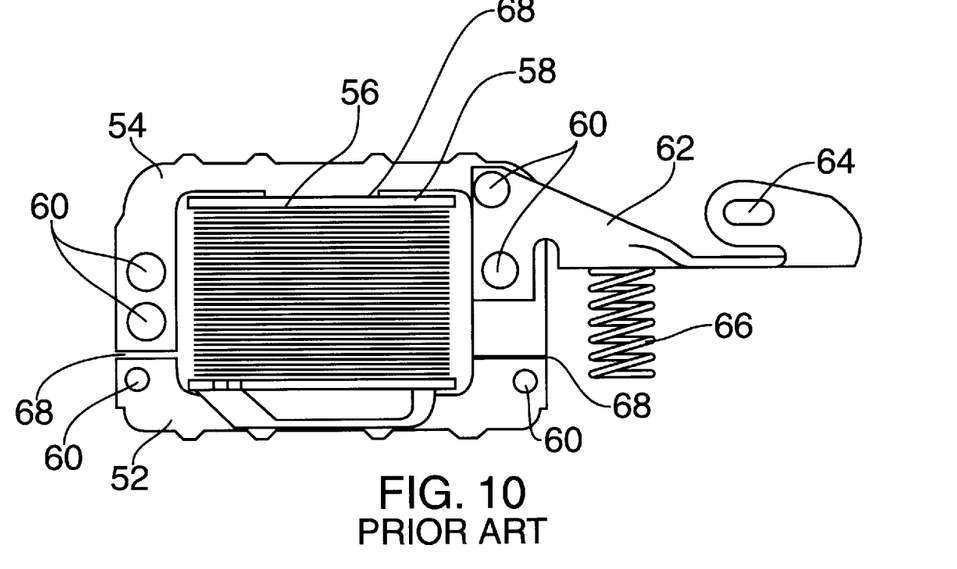
FIG. 10 is a front elevational view of a typical prior art motor design.
Figure 11:
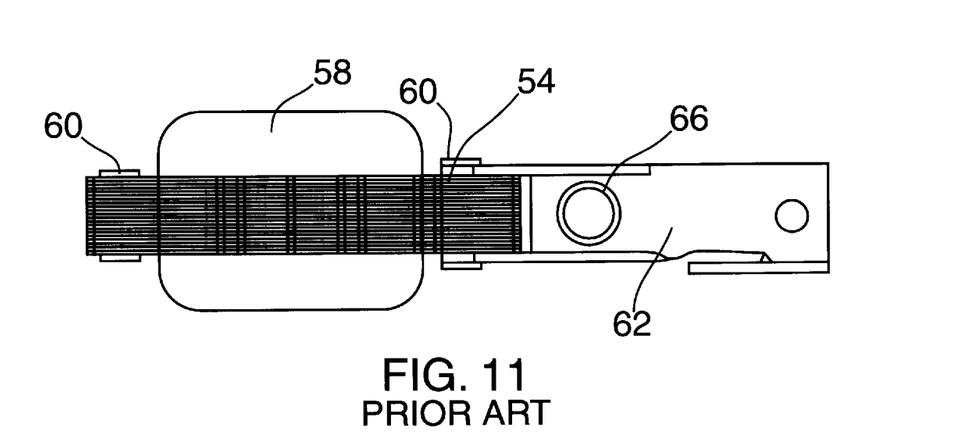
FIG. 11 is a top view of a typical prior art motor design.

A typical prior art design for a vibratory motor is shown in various views in FIGS. 9–11. Stator 52 is a three pole stator, thus, there are three air gaps 68, visible on FIG. 10. One important difference between the prior art units and the current design is that the prior art units vibrate about a point external to stator 52 and armature 54. On the prior art unit, shown in FIGS. 9–11, stator 52 is fixed within the housing of the unit. Armature 54 and attachment member 62 are connected to the housing at adjustment point 64 and biasing spring 66 contacts attachment member 62 as shown. Armature 54 vibrates via the bending of attachment member 62 as stator 52 and armature 54 are attracted to each other by the force of the magnetic field with air gaps 68, and is drawn back to the resting position via the force exerted by biasing spring 66. Note that the oval shape of adjustment point 64 allows for adjustment of armature 54 and attachment member 62 back and forth with respect to stator 52, and adjustment screw 70 allows for the adjustment of the width of air gaps 68. Adjustment point 64 and adjustment screw 70 are eliminated with the current design, since stator 10 and armature 12 are fixed in position with respect to each other and housing member 30. Previously, adjustment of the prior art unit during the manufacture process required iterative adjustments of both the position of armature 54 with respect to stator 52 via adjustment point 64, the adjustment of the width of air gaps 68 via adjustment screw 70, and the adjustment of the tension on biasing spring 66 via an adjustment screw (not shown). Adjustment of the current design during the manufacturing process is therefore a single, non-iterative step which consumes far less time to adjust than the unit of the prior art.

In addition, the vibration of armature 54 with respect to stator 52 caused attachment member 62 to bend back and forth in response to the attractive force between armature 54 and stator 52 and the force exerted by spring 70 to separate armature 54 and stator 52 each half-cycle. This bending action would often cause attachment member 62 to crack between biasing spring 66 and attachment point 64. This problem has also been eliminated by the current design since armature 12 of the new design rotates on pivot 20.

Figure 8:
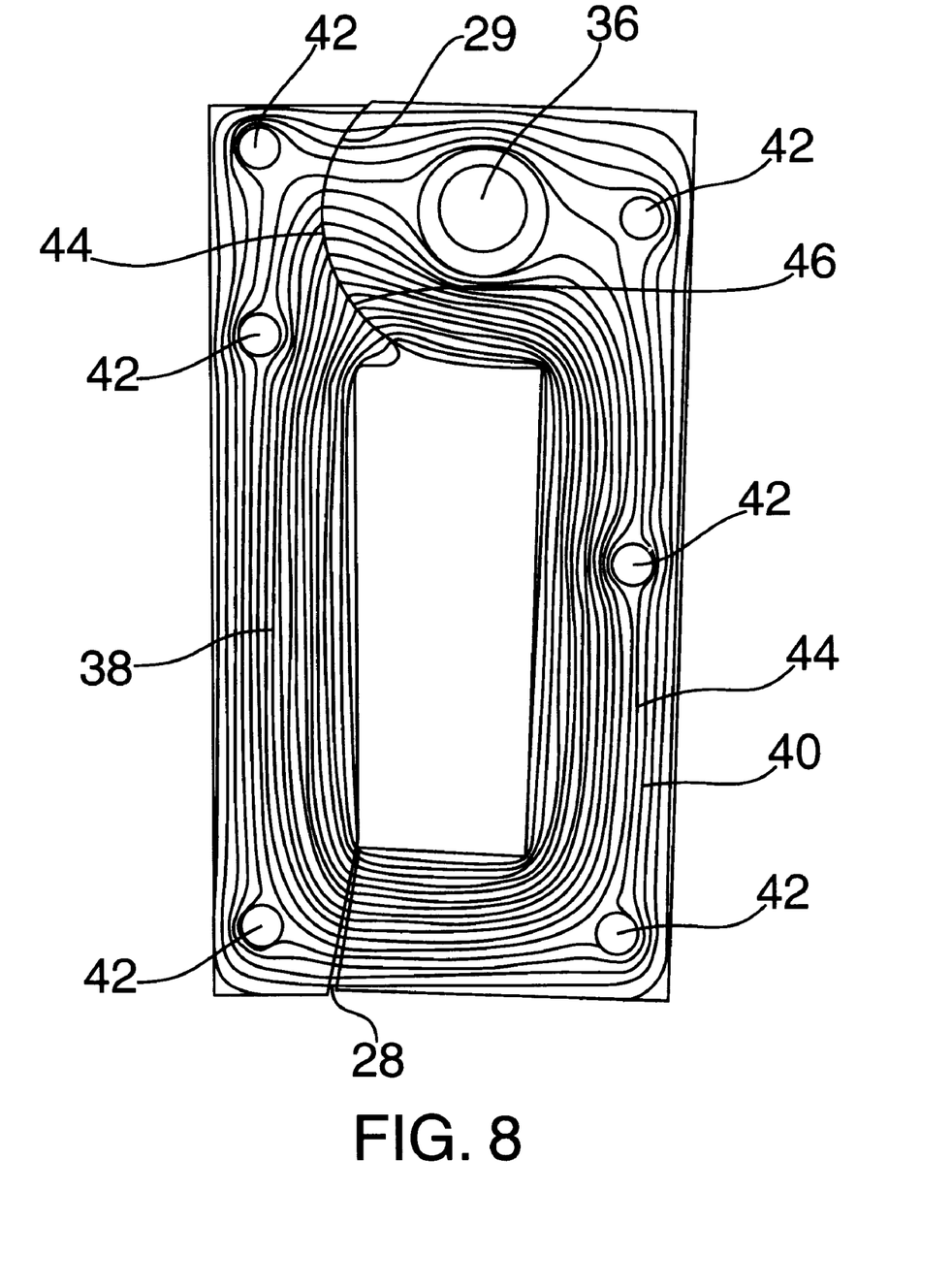
FIG. 8 is a view of a lamination of the new motor design showing the flow of magnetic flux therethrough.

The current design also is more efficient than designs of the prior art, producing more output wattage per dollar of manufacturing cost. The new lamination design, shown best in FIGS. 6 and 7, is more efficient at conducting magnetic flux, as shown in FIG. 8, and therefore requires less mass of steel in stator 10 and armature 12 and a fewer number of windings in coil 14. It has been found that the current design will require approximately 20% less steel in the laminations of stator 10 and armature 12 and approximately 25% fewer windings of enameled copper wire in coil 14 to produce the same power output as the prior art motor.

One further advantage of the current design is that it allows for a greater travel of load 24. It will be appreciated by those skilled in the art that the force exerted between stator 10 and armature 12 is inversely proportional to the width of air gap 28. When more than one air gap is present, the energy must be distributed over all air gaps, thereby reducing the effective maximum distance between the stator and the armature, and thereby also reducing the maximum travel distance of the load, which is typically directly coupled to the armature. If, for example, two air gaps are present, as in many of the prior art designs, the force must be distributed over both gaps, effectively halving the maximum possible with of the air gap during operation of the unit.

Although preferred embodiment of the present invention has been described above by way of example only, it will be understood by those skilled in the art that modifications may be made to the disclosed embodiments without departing from the scope of the invention, which is defined by the appended claims, including all equivalents thereof.

I claim:

1. A motor for providing reciprocating motion comprising:

a. a support member;

b. a stator configured as a generally straight, elongated leg member, said stator having a plurality of pole faces, at least one of which is arcuate in shape, said stator being rigidly attached to said support member;

c. an armature having a plurality of pole faces, at least one of which is arcuate in shape and complimentary to said arcuate pole face of said stator, said armature being pivotally attached to said support member, thereby defining an arcuate, fixed air gap between said arcuate pole face of said stator and said arcuate pole face of said armature;

d. one or more induction coils wrapped around either of said stator or said armature; and e. at least one variable air gap defined by a pole face of said stator and a pole face of said armature, said variable air gap varying in width as said armature rotates about said pivot point and vibrates back and for with respect to said stator when an electrical signal is coupled with said induction coils.

2. The motor of claim 1 further comprising a post which serves as the pivotal attachment of said armature to said support member, wherein said post passes through said armature at the center point of a circle, said circle having a circumference containing an arc which defines said arcuate pole face of said armature.

3. The motor of claim 1 further comprising a resilient biasing member coupled to said armature.

4. The motor of claim 3 wherein said resilient biasing member is a spring.

5. The motor of claim 1 wherein said one or more induction coils are coils of copper wire.

6. The motor of claim 5 wherein said coils of copper wire are enameled.

7. The motor of claim 5 wherein said one or more coils of copper wire are wound about a bobbin composed of a non-conductive material and wherein said stator passes through said bobbin such that a magnetic flux is induced into said stator when an electric current is coupled to said one or more coils of copper wire.

8. The motor of claim 1 wherein said stator and said armature comprise a plurality of laminations of a material capable of conducting a magnetic flux, said laminations arranged in a stacked relationship with each other.

9. The motor of claim 8 wherein said laminations are composed of steel.

10. The motor of claim 2 wherein said armature vibrates with respect to said stator about said post when an alternating electrical current is coupled to said coil.

11. The motor of claim 10 wherein said alternating current alternates between a high peak voltage and a low peak voltage and wherein said armature is rotated by a magnetic field in said air gap toward said stator, thereby narrowing said air gap, as said alternating current approaches said high peak voltage or said low peak voltage and wherein resilient biasing means rotates said armature away from said stator as said alternating current approaches zero voltage, thereby widening said air gap.

12. The motor of claim 1 wherein a load is coupled to said armature.

13. A motor for providing reciprocating motion comprising:

a. a stator having a plurality of pole faces, said stator configured as a generally straight elongated leg member, and;

b. an armature having a pivot hole defined therein and having a plurality of pole faces; wherein a fixed air gap is defined between one pole face of said stator and one pole face of said armature and wherein said armature rotates about a pivot which passes through said pivot hole.

* * * * *